Jan. 18, 1966 D. FERRANTE ETAL 3,230,535
MICROWAVE SCANNING APPARATUS EMPLOYING FEED HORN
COUPLED TO SPACED LENS BY
COAXIAL TRANSMISSION LINES
Filed Dec. 26, 1961 4 Sheets-Sheet 1

INVENTOR.
DOMINIC FERRANTE
BY RICHARD RUBIN

ATTORNEY

INVENTOR.
DOMINIC FERRANTE
BY RICHARD RUBIN

ATTORNEY

United States Patent Office 3,230,535
Patented Jan. 18, 1966

3,230,535
MICROWAVE SCANNING APPARATUS EMPLOYING FEED HORN COUPLED TO SPACED LENS BY COAXIAL TRANSMISSION LINES
Dominic Ferrante, Wayland, and Richard Rubin, Natick, Mass., assignors to Sylvania Electric Products Inc., a corporation of Delaware
Filed Dec. 26, 1961, Ser. No. 162,098
16 Claims. (Cl. 343—754)

This invention relates generally to microwave apparatus and is more particularly concerned with rapid microwave scanning systems of the type commonly known in the are as organ-pipe scanners.

Microwave scanning devices, one form of which is known as the organ pipe scanner, are used in a variety of applications, a typical function being to transfer microwave energy from a rotatable horn to the feed arc of a geodesic lens to effect scanning of the beam formed by the lens. Heretofore, the organ pipe scanner has consisted typically of a feed horn, rotatable about an axis normal to the longitudinal axis of the horn, such that the plane of the horn aperture traverses a circle, or an arc of a circle. A plurality of wave guides extended radially outward from this circle, and as the horn is rotated past the open ends of the wave guides, the electromagnetic field generated by the horn is sequentially transferred to successive adjacent wave guides for transmission to a suitable antenna feed, such as a geodesic lens.

Although this form of scanner is suitable for some application, it has a number of inherent disadvantages which limit its applicability. For example, because of the changing position of the feed horn relative to the wave guides, the field distribution transferred from the feed horn to the wave guides is not continuously symmetrical. As the feed horn rotates, the distribution of the power from the scanner horn is unsymmetrical, the non-symmetry of excitation shifting first from one side of the feed horn axis to the other side in a continuous manner. Since the antenna to which the scanner is coupled appears to be fed at the center of the field distribution, and since the center of the field distribution changes as the feed horn rotates, the beam angle does not vary linearly with the rotation of the horn causing boresight errors during scanning, commonly known as "cogging." This shift in the excitation also causes poor null depths in the difference pattern of the antenna, making the system unsuitable for use in precision target location and tracking radar systems. Theoretically, a large number of wave guides per feed horn could be used to reduce "cogging," but the attendant mechanical problems would be multiplied due to the size of the complete device. For example, the asymmetry effects could be reduced by arranging the fed guides with their long dimension in the vertical direction and exciting them in a mode such that the E-field is horizontal. With this arrangement, however, the spacing of the plates of the lens to which the guides are coupled is determined by the long dimension of the wave guide cross-section, and since the velocity of propagation in the lens is critically dependent upon the spacing of the lens plates, they must be fabricated to very close tolerances. Because such lenses are usually of relatively large area, the problems involved in maintaining the necessary tolerances on the wave guide and lens dimensions would be almost impossible of solution. Moreover, the size, weight and requisite rigidity of the structure would seriously limit the applications in which it could be used.

With an appreciation of the foregoing limitations of available scanning devices, applicants have as a primary object of the present invention to provide an improved device for transferring an electromagnetic field from one location to another without significant distortion or loss of power.

Another object of the invention is to provide a rapid scanning device which permits precision scanning and tracking in either conventional or monopulse radar systems.

Another object of the invention is to provide an improved precision rapid scanning device.

Still another object of the invention is to provide an improved scanning device of the type known as an organ-pipe scanner.

Still another object of the invention is to provide a high power microwave switching device.

Briefly, in the illustrated embodiment of the invention these objects are attained by a scanning device consisting of a feed horn rotatably mounted within an annular structure and coupled thereto in such a manner that as the feed horn rotates, there is always a matched impedance between the feed horn and the cavity formed by that portion of the annular structure confronting the aperture of the horn. The horn is shaped in the vicinity of its aperture in a manner to prevent the transmission of energy into the annular cavity, except to the portion confronting the horn aperture. These features of the scanner permit the transfer of energy from the rotatable feed horn into a sector of the annular cavity with little distortion and with little loss of power.

The electromagnetic field produced in the cavity by the horn is coupled to a suitable radiator, or feed element for a radiator, the radiation pattern of which it is desired to scan. By way of example, the radiating element may be a geodesic analog of a Luneberg lens. Coaxial transmission lines of equal length are used to transpose energy from the scanner to the focal arc of the lens. These transmission lines connect an array of probes disposed along the focal arc of the lens to an array of probes in the scanner, arranged around the periphery of a circle and extending into the above described annular cavity. The probes in the scanner are spaced sufficiently close to each other that there are a plurality of probes opposite the aperture of the horn, regardless of the rotational position of the horn, the more probes per aperture width the smoother the transfer of the field distribution pattern. The probes in the device to which the energy is to be transferred are proportionately spaced along the focal arc of that device, and since the radius of the feed element is normally larger than the radius of the scanner, the probe spacing in the lens may be larger than the spacing in the scanner. Thus, for example, the number of probes appropriately spaced around the periphery of the scanner may be spaced along the focal arc of the lens, which may be only a 60° sector. The significant point is that although the number of probes in the scanner and the device to which the energy is to be transferred is the same, the spacings of the probes in the two devices can be different and arranged to provide the most desirable illumination of the antenna to give a specified beam pattern. At any instantaneous position of the feed horn scanner, a portion of the probes are excited, and a corresponding electromagnetic field is coupled to the corresponding probes in the lens. As the horn rotates past the complete array of probes, the lens sweeps through a complete sector of scan, the width of which is determined by the length of the arc over which the probes in the lens are distributed. This arrangement of coupling gives a smooth aperture distribution at the lens so as to provide an extremely high tracking accuracy, and also affords a high speed scanning capability for a monopulse antenna.

Other objects, features and advantages of the invention and a better understanding of its construction and operation will be apparent from the following detailed description taken in conjunction with the accompanying drawings, in which.

Figure 1:
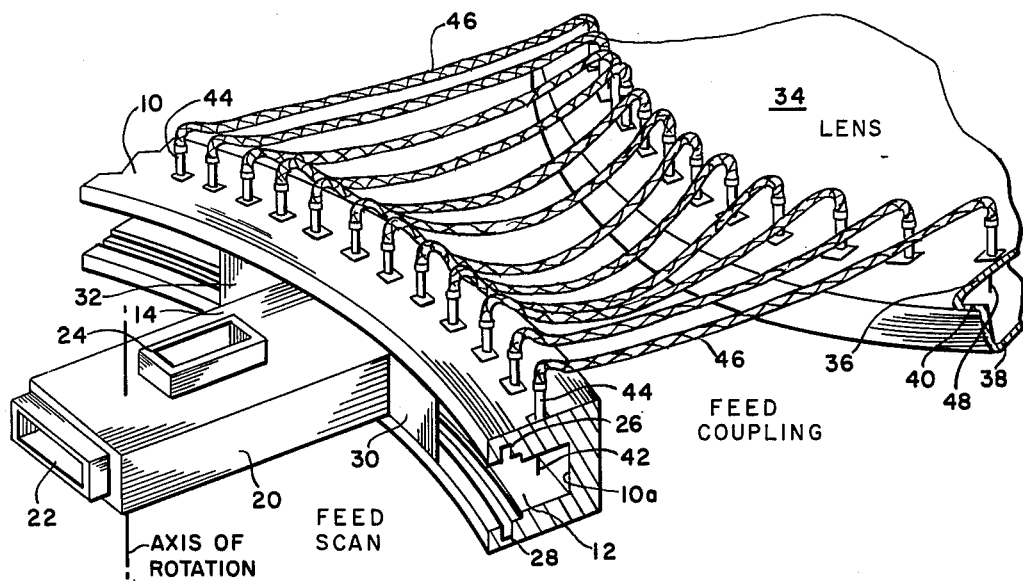
FIGURE 1 is a prespective view, partially broken away, of a preferred embodiment of the invention.

Referring now to FIG. 1, the scanner, according to the invention, is shown connected to a geodesic lens antenna, with the feed horn of the scanner being of a type suitable for monopulse operation. It should be understood, however, that the geodesic lens is only one example of a device to which energy can be transferred by the present scanner, and that a single aperture feed horn can be used if the scanner is to be used in conventional systems. The scanner consists of an annular housing 10 formed of conducting material, having an annular cavity 12 of rectangular cross section formed therein extending around the periphery of the housing, the cavity being open from the side facing radially inward. The cavity 12 is excited by a feed horn 14 positioned generally in the plane of the housing 10 and arranged for rotation about an axis perpendicular to the plane of the housing. The horn is excited at its inner end from a suitable rotary joint (not shown), of which many forms are known to the art, the horn structure being supported on a suitable bearing structure (also not shown) for rotation about the aforesaid axis. The horn may be driven in rotation by a motor, in one direction only, or it may be driven with a back and forth motion across a desired sector of the housing, depending upon the application in which the scanner is to be used.

Figure 2:
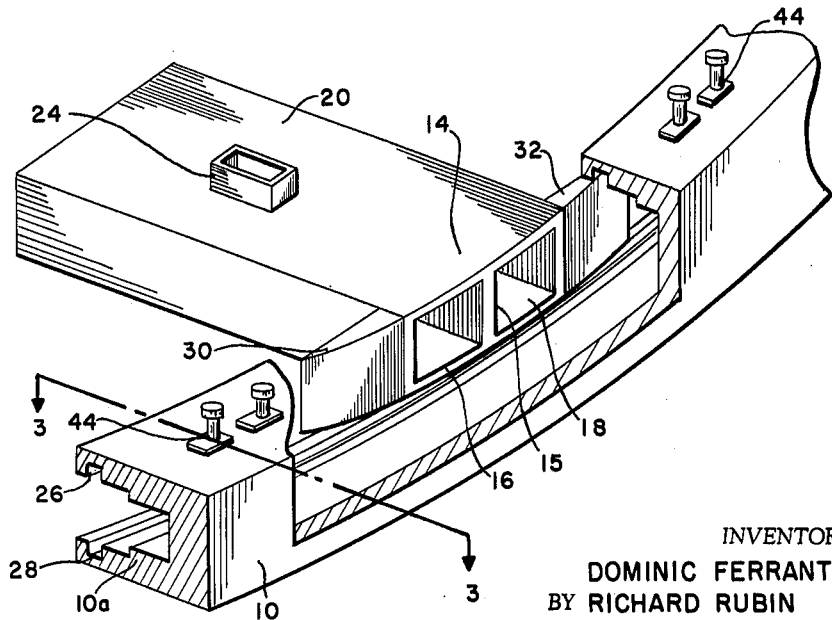
FIGURE 2 is a fragmentary perspective view of a portion of the device of FIG. 1, illustrating the construction of the feed horn.
Figure 4:
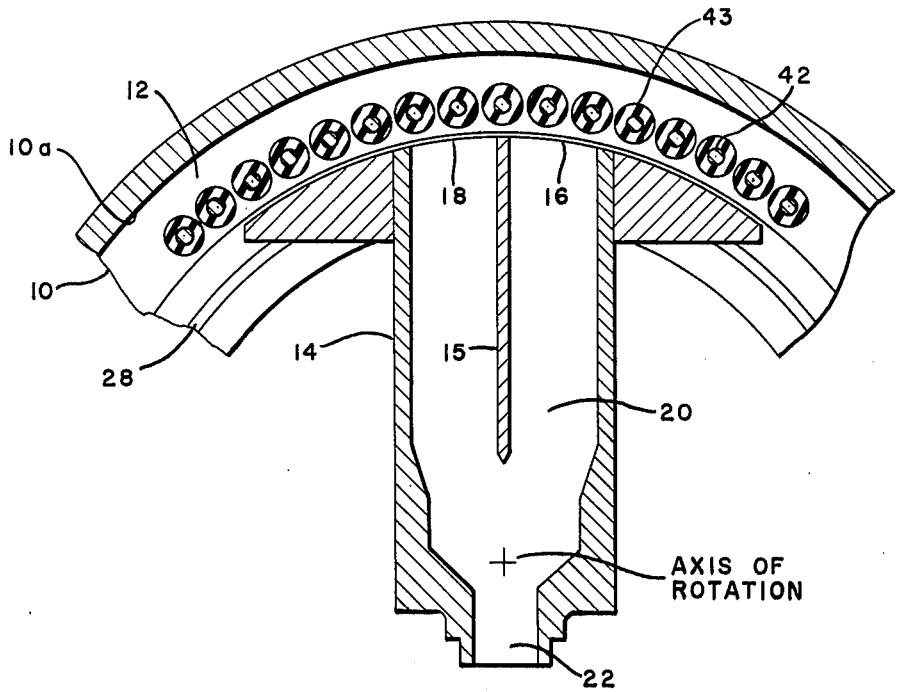
FIGURE 4 is a fragmentary cross-section view, taken along line 4—4 of FIG. 3, showing details of construction of the feed horn and its relationship to the annular cavity.

As was mentioned earlier, and as is shown in FIGS. 2 and 4, the illustrated horn is of the type used in monopulse systems, consisting of a wave guide divided by a septum 15 to provide two apertures 16 and 18 which are fed by a folded H-plane hybrid 20, a device commonly used in monopulse systems to obtain sum and difference information from a received signal. Suffice it to say for purposes of illustrating the present invention, this type of hybrid has a sum port 22 through which the horn is energized and from which sum information is derived, and a difference port 24 from which difference information is obtained. During transmission of energy, the hybrid is energized through port 22 to launch energy in the appropriate mode into the bifurcated horn. The field distribution of the horn can be shaped by introducing energy in the $TE_{30}$ mode with the $TE_{10}$ mode in the appropriate ratio and at the aperture adding the $TE_{30}$ mode in phase with the $TE_{10}$ mode to increase the resulting pattern beam width. This aspect of the horn is important in adapting the scanner to a particular function, but is not essential to the understanding of the broad principles of the present invention.

Figure 3:
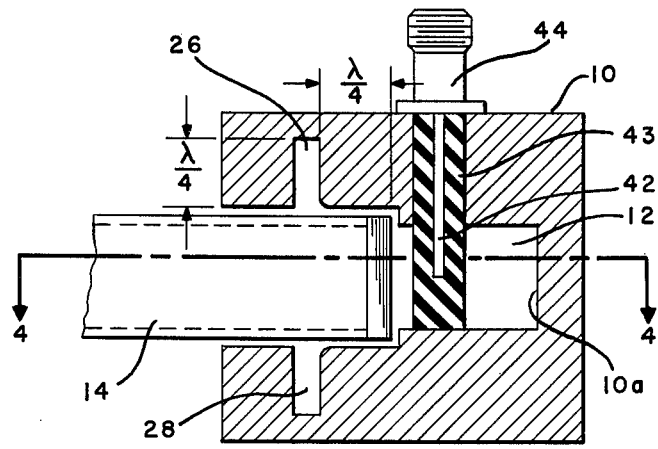
FIGURE 3 is a fragmentary view, taken along line 3—3 of FIG. 2, showing details of construction of the annular cavity.

The hybrid and horn structure is so dimensioned in the length direction that the plane of the apertures 16 and 18 traverses a circle lying radially inward from the outer wall 10a of the cavity 12 and outward from the open side of the cavity. As can be best seen in FIG. 3, height dimension of the horn is slightly less than the height dimension of the annular cavity 12 to allow the horn to be rotated in the housing without making mechanical contact. To prevent energy radiated from the horn, or present within the cavity confronting the horn, from being conducted back over the upper and lower surfaces of the horn, a pair of chokes, consisting of circumferential grooves 26 and 28 in the upper and lower walls, respectively, of the cavity 12, are provided. These grooves lie on circles spaced inwardly a quarter wavelength at the operating frequency from the plane of the horn aperture, and each are a quarter wavelength deep, so as to reflect a short circuit between the horn and the upper and lower walls of the housing along the circle traversed by the aperture of the horn.

The electromagnetic energy coupled to the annular cavity 12 from the horn 14 is confined to the region of the cavity confronting the horn by a pair of skirts 30 and 32 formed of conductive material and secured to the sidewalls of the horn. These skirts extend in a circumferential direction to either side of the horn, the outer curved surface of the skirts lying generally along an arc of the circle traversed by the aperture as the horn is rotated. The distance between the skirts and the wall 10a of the cavity is beyond cutoff at the frequency of operation thereby preventing energy from spreading around the cavity beyond the ends of the skirts. The skirts also suppress resonances which might otherwise occur in the annular cavity and help to insure distortionless transfer of energy from the horn to cavity. Thus, the energy transferred from the horn is confined to that portion of the annular cavity which confronts the horn, the field distribution in the cavity being very similar to that occurring across the aperture of the horn itself. Consequently, as the horn is rotated, the field distribution of the horn is successively presented in different portions of the annular cavity.

Referring again to FIG. 1, energy from the annular cavity 12 is transferred to a suitable radiator capable of producing a beam of radiation which may be scanned by changing the point of excitation thereof. The device 34 shown is a godesic analogue of a Luneberg lens, consisting of a pair of spaced parallel conductive plates 36 and 38 and a back conducting wall 40 which lies along a semi-circle. This type of lens is well known, and normally utilizes the TEM parallel plate mode. This form of lens collimates energy introduced at the focal arc of the lens into an in-phase distribution at the lens output. The in-phase distribution is normal to a line drawn through the center of the lens from the point on the focal arc where the energy is introduced. Accordingly, scanning with such a lens can be accomplished by changing the point of excitation along the focal arc of the lens. Lenses of this type can be designed to scan approximately a ±30° sector of space upon suitably changing the point of excitation along the focal arc. The point of excitation is changed, in accordance with this invention, by transferring energy from the rotatable scanner to correspondingly spaced apart points along the focal arc of the lens.

This is accomplished by an array of probes 42, coupled to the cavity 12 of the scanner, distributed around the circumference of the cavity. This array of probes is arranged along a circle lying as close as practicable to the circle traversed by the aperture of the horn 14. The probes are preferably uniformly spaced, and in general are placed as close to each other as space requirements for the probes will allow. In the illustrated embodiment, the probes 42 are encased in a sleeve 43 of dielectric material, such as Teflon, to prevent breakdown between the tips of the probes and the walls of the cavity 12 when the scanner is used under high peak power conditions. The cylinders limit how closely the probes can be spaced to each other, but a satisfactory compromise between power handling capability and smoothness of field distribution transfer is readily obtainable. In a scanner which has been successfully operated, six probes were distributed across the aperture of horn 14. The impedance of the horn 14 is matched to the cavity 12 to prevent discontinuities in the transfer of energy from the horn to the probe, factors affecting the match being the diameter and length of the probes, the thickness of the insulation 43, and the spacing of the wall 10a from the probes. It should be noted that the horn is matched to the group of probes which confront the aperture, not the individual probes, for there is some interaction between the probes of the group.

Each of the probes 42 in the scanner is connected through a suitable coaxial coupler 44, and equal length coaxial transmission lines 46, to a similar array of probes 48 arranged along the focal arc of the lens 34. The spacing between the probes 48 need not be the same as the spacing between the probes in the scanner, but rather, are spaced at such a distance as to be uniformly distributed across the length of focal arc of the particular lens. For example, while the probes in the scanner are uniformly distributed around the periphery of an entire circle, the probes in the lens are uniformly distributed along an arc of much longer radius, in the aforesaid successfully operated system, an arc of 50°. It will now be apparent that as the horn 14 is rotated, different groups of probes 42 in the scanner are energized with the consequence that different groups of probes 48 in the lens are energized. Thus, the point of excitation of the lens is changed in accordance with the position of the horn with an attendant scanning of the beam generated by the lens.

Figure 5:
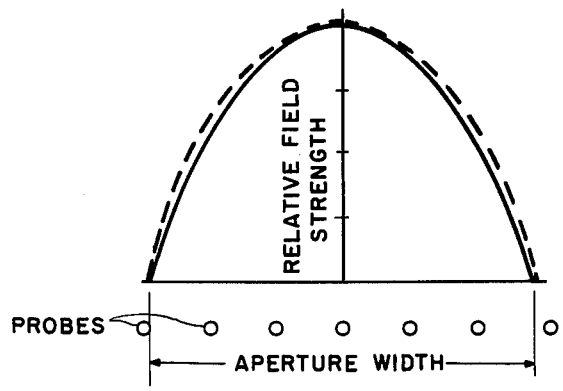
FIGURES 5 and 6 are graphs illustrating the transferred field distribution for two different positions of the feed horn relative to the array of probes of the scanner for excitation in the $TE_{10}$ mode.
Figure 6:
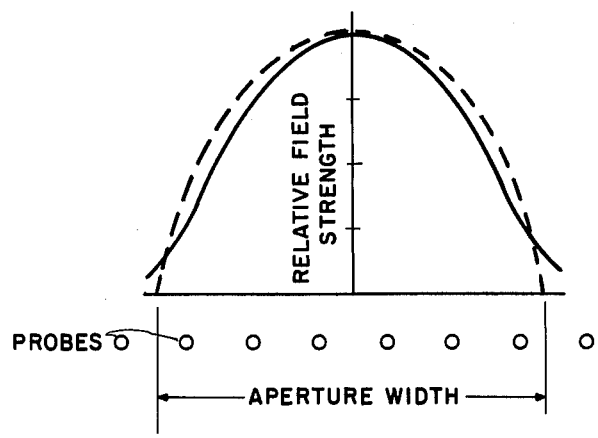

A significant advantage of the herein described type of coupling is the fidelity with which the field distribution at the aperture of the horn 14 is transferred to the input of the lens 34. By using a relatively large number of pickup probes per aperture width of the horn 14, the pickup probe distribution is very nearly the same as the horn output distribution, the smoothness being enhanced somewhat by the mutual coupling between probes. Thus, it follows that the field distribution at probes 48 in the lens is very nearly the same as the field distribution across the aperture of the horn. That the pickup probe field distribution is very nearly the same as the horn output distribution, regardless of the position of the aperture of the horn relative to those probes in the array which it confronts, will be apparent from FIGS. 5 and 6 which show the theoretical and measured field distribution across a group of probes for excitation in the $TE_{10}$ mode for two different positions of the horn aperture relative to the probe array. The data of FIG. 5 is for the case when five of the probes 42 are symmetrically located in front of the aperture of the horn 14, while FIG. 6 shows data for the situation where the aperture has shifted relative to the array of probes by slightly more than half the distance between probes, such that six probes confront the aperture. In both graphs, the dotted curve is the theoretical field distribution across the aperture of the feed horn, and the solid curve is the measured field distribution at the probes. It will be seen that the field distribution at the probes changes very little as the aperture of the feed horn is shifted by incremental amounts relative to the array due to the rotation of the feed horn. The significance of this comparison is that the present scanner does not have the "cogging" errors which are inherent in wave guide organ pipe scanners.

Figure 7:
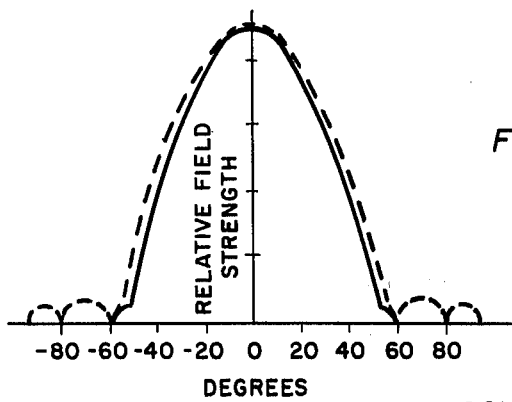
FIGURE 7 is a graph showing the transferred field distribution from the feed horn to the lens in the system of FIG. 1 for excitation in the $TE_{10}$ mode.

The curves of FIG. 7 show the efficacy of transfer of the field distribution of the horn 14 to the feed probes 48 of the lens 34. This figure compares pattern measurements of the horn 14 operating in the $TE_{10}$ mode with the input pattern to the lens, both patterns having been measured in a confined region corresponding to the parallel plate input of the lens. The dotted curve is the measured field distribution at the aperture at the feed horn, and the solid curve is the measured field distribution at the input to the lens 34. Although some narrowing of the pattern occurs in the transfer from the horn to the lens, it will be seen that there is very good agreement between the field distribution at these two separated points in the system. Such narrowing as occurs is due to the directivity of the probes 42 and 48, and to a lesser degree by the excitation by mutual coupling of some of the probes at the end of the array of the lens. Consideration must be given to this effect in arriving at a proper illumination of the lens for a particular application.

Figure 8:
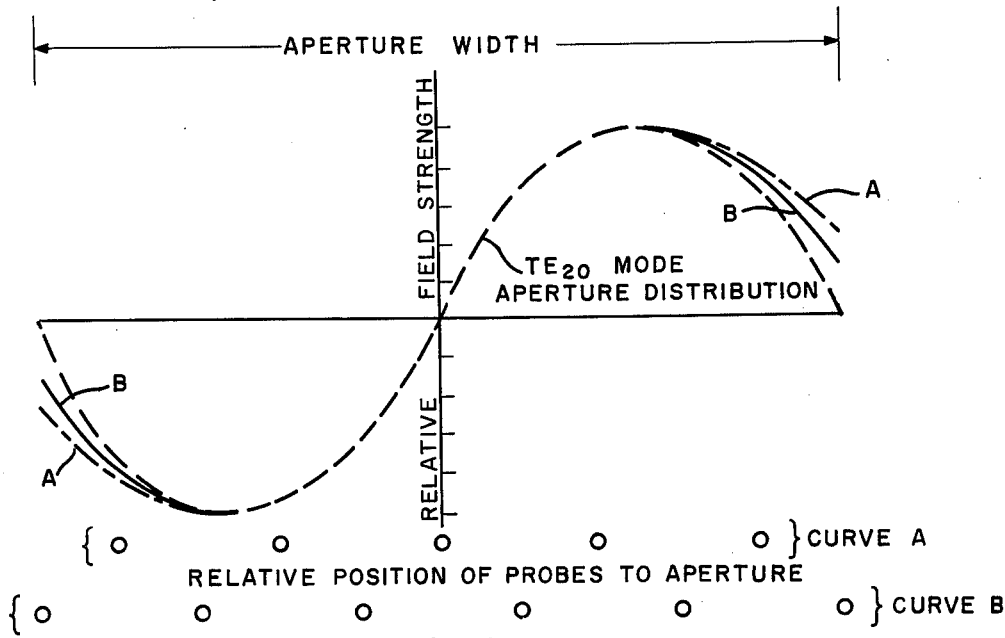
FIGURE 8 shows the transferred field distribution for two different positions of the feed horn relative to the array of probes for excitation in the $TE_{20}$ mode.
Figure 9:
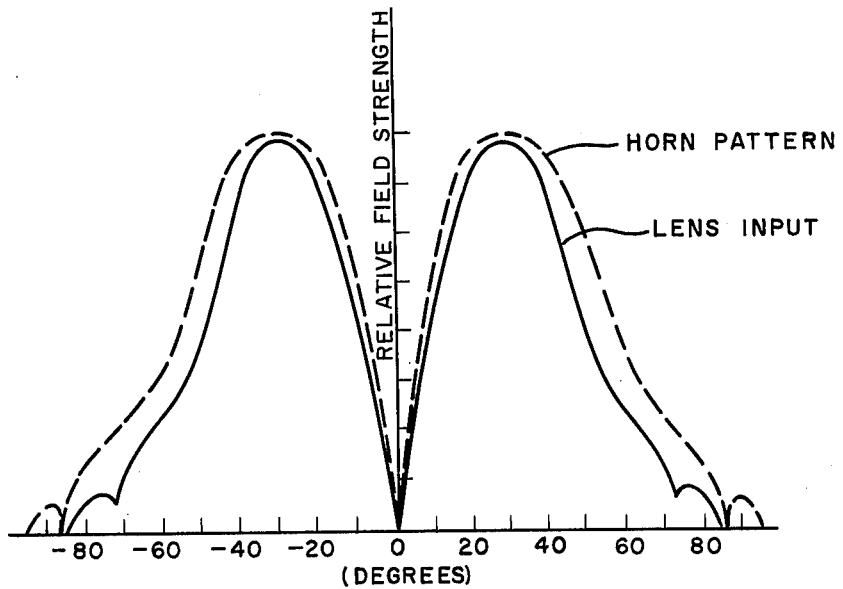
FIGURE 9 is a normalized plot of the measured patterns of the horn and of the lens input for excitation in the $TE_{20}$ mode.

The results of similar measurements of the field transfer distribution characteristics for the $TE_{20}$ mode are plotted in FIG. 8. These plots show a marked increase in the amount of field picked up at the probes located at the edges of the aperture, which might be expected to result in smaller beamwidth at the lens input than at the output of the horn. FIG. 9, however, which is a normalized plot of the measured patterns of the horn and the lens input, both measured in a confined region corresponding to the parallel plate input to the lens, shows a resulting pattern which was more desirable than the horn pattern.

From the foregoing it is seen that the described method for transferring field distribution patterns permits excitation of the lens 34 from a small effective feed aperture; namely, an aperture corresponding in size to the aperture of the horn. The scanner structure, and consequently the aperture of the horn, is desirably made as small as possible in the interest of reducing weight and mechanical inertia, with the result that the lens 34, which is normally much larger than the scanner, is excited from essentially a point source. As a result, lens 34 is capable of producing a highly directional pattern which may be scanned by rotating the low-inertia feed horn.

Although FIG. 1 illustrates an array of probes uniformly distributed about a circle, spaced apart a distance such that six probes confront the aperture of the horn at any one instant of time, it is to be understood that this configuration is by way of example only, since many other probe configurations are possible. For example, more probes could be made to confront the aperture, with an attendant smoother distribution, by arranging two arrays of probes along concentric circles with the probes in one array positioned between the probes in the other array. Neither is it necessary that the array of probes extend completely around the scanner; in some applications it might be possible to obtain the desired scanning action by distributing the array of probes along only a sector of the cavity 12 and moving the feed horn back and forth across the array. Alternatively, with a sector array, scanning in one direction, with a certain amount of "dead time" between scans, could be obtained by rotating the feed horn in one direction across the array. Further, although uniform spacing of the probes in both the scanner and the lens have been described, the invention is not so limited. By changing the probe spacing and configuration at the scanner, or at the lens, or both, a variety of field patterns can be obtained; i.e., it may not always be desirable to transfer to the lens 34 the exact field distribution of the horn 14. For example, if the probe spacing in the lens 34 is made smaller than the probe spacing of the scanner, the effective aperture of the antenna feed can be reduced with an attendant narrowing of the antenna feed. Thus, the present scanner offers a degree of flexibility which is unobtainable with a wave guide organ pipe scanner.

It is again emphasized that the invention has utility in numerous applications other than those specifically illustrated. For example, instead of illuminating only a few probes in-phase, over a relatively small arc, the scanner can be modified to excite individual elements in a Wullenweber circular array of elements by flaring the feed horn to illuminate a larger number of probes and simultaneously providing the proper phase relationship across the aperture by dielectric or metallic inserts in the flare of the horn. In this application, the coaxial cables connect the probes directly to the radiating elements of the circular array rather than to the feed elements of a lens. The scanner functions as a collimating device, providing signals of the proper amplitude and phase for exciting the elements of the array. Or, energy can be coupled from cavity 12 to a similar cavity in a remote structure having similarly placed probes, such an arrangement having characteristics of a high power switch.

While the invention has been described as embodied in a rotatable scanner, the principles are applicable to a device with rectilinear scanning motion. That is, the housing 10 instead of being annular form may be straight with the feed horn projecting into the cavity and arranged for back and forth motion between the ends of the housing. The probes may be coupled to a similarly spaced array of probes in another device, which array may be curved or straight as the application may require.

Thus, while arrangements of the invention described herein are at present considered to be preferred, it is to be understood that changes and modifications may be made therein and it is intended to cover in the appended claims all such variations and modifications as fall within the true spirit and scope of the invention.

What is claimed is:

1. Microwave apparatus comprising, a housing having an elongated cavity formed therein, said cavity being of generally rectangular cross-section with one side thereof open, an array of spaced apart probes distributed along at least a portion of the length of said housing and extending into said cavity in a direction substantially parallel to the open side thereof, a feed horn projecting into the open side of said cavity with its aperture closely confronting said array of probes, the dimension of said horn in the direction transversely of said probes being sufficiently greater than the spacing of said probes that a plurality of probes are distributed across the aperture of said horn, and means supporting said horn for relative movement of its aperture across said array in a plane closely parallel to said array.

2. Microwave apparatus comprising, a housing formed of conducting material having an elongated cavity formed therein, said cavity being of generally rectangular cross-section with one sides thereof open, a plurality of probes equally distributed in an array along at least a portion of the length of said housing and extending into said cavity in a direction substantially parallel to the open side thereof, a feed horn having a rectangular aperture the width dimension of which is substantially greater than the spacing between said probes but less than the length of said array and the height dimension of which is substantially equal to the height dimension of said cavity, said horn projecting into said cavity through the open side thereof with its aperture closely confronting said array of probes and disposed substantially parallel to said probes, and means supporting said horn for movement of its aperture across said array of probes in a plane closely parallel to said array.

3. Microwave apparatus comprising, an annular housing having an annular cavity therein, a plurality of probes distributed in an array concentric with said cavity along at least a portion of the length of said housing and projecting into said cavity into energy-coupling relationship therewith, a feed horn extending into said cavity with its aperture closely confronting said array of probes, and means supporting said horn for movement of its aperture across said array of probes along the arc of a circle concentric with said array.

4. Microwave apparatus comprising, an annular housing formed of conducting material having an annular cavity formed therein, the side of the cavity facing radially inward being open, an array of parallel probes distributed along at least a portion of the circumference of said housing and extending into said cavity to couple energy therefrom, a feed horn projecting into the open side of said cavity with its aperture closely confronting said array and supported for rotation in the plane of said housing about the axis thereof to cause the aperture of said horn to traverse a circle of slightly smaller diameter than the diameter of said array.

5. Microwave apparatus comprising, an annular housing formed of conducting material having an annular cavity formed therein, said cavity being of generally rectangular cross-section with the side thereof facing radially inward being open, a plurality of parallel probes uniformly distributed in an array along at least a portion of the circumference of said housing and extending into said cavity in a direction substantially normal to the plane of said housing, a feed horn having a rectangular aperture projecting into the open side of said cavity with the aperture closely confronting said array of probes, the width dimension of said horn being sufficiently greater than the spacing of said probes that a plurality of probes are spanned by the aperture of said horn, and means supporting said horn for rotation in the plane of said housing about the axis thereof to cause said aperture to be scanned across said array along the arc of a circle concentric with said array.

6. Microwave apparatus comprising, an annular housing formed of conducting material having an annular cavity formed therein, said cavity being of generally rectangular cross-section with the side thereof facing radially inward being open, a plurality of probes uniformly distributed in an array along at least a portion of the circumference of said housing and extending into said cavity in a direction substantially normal to the plane of said housing, a feed horn having a rectangular aperture projecting into the open side of said cavity with the aperture closely confronting said array of probes, the width dimension of said horn being sufficiently greater than the spacing of said probes that a plurality of probes are distributed across the aperture of said horn, conductive members mounted on the side walls of said horn substantially in the plane of its aperture and extending therefrom for confining energy from the horn to the region of said cavity directly in front of the aperture, and means supporting said horn for rotation in the plane of said housing about the axis thereof to cause said aperture to be scanned across said array.

7. Apparatus for transforming the electromagnetic field distribution pattern across the aperture of a horn radiator to a device remote from the horn, comprising a plurality of probes disposed parallel to each other and uniformly distributed in an elongated array, means supporting said horn with its aperture closely confronting said array of probes and with the plane of the aperture disposed substantially parallel to said probes, said probes being spaced to provide a plurality of probes distributed across the width dimension of the aperture and arranged parallel to the electric component of the field pattern of said horn, said horn supporting means including means for moving the aperture of the horn relative to said array of probes in a plane closely parallel to said array, a like plurality of elements uniformly distributed in an array in said remote device, and a like plurality of coaxial conductors connecting said probes to corresponding ones of said elements.

8. Apparatus for transferring the electromagnetic field distribution pattern of a horn radiator having a rectangular aperture to a device remote from the horn, comprising, an annular housing having an annular cavity formed therein, the side of the cavity facing radially inward being open, a plurality of parallel probes uniformly distributed in an array along at least a portion of the circumference of said housing and extending into said cavity, means supporting said horn with its aperture closely confronting said array and lying in a plane substantially parallel to the probes it confronts, said probes being spaced such that a group of several probes are spanned by the width dimension of the aperture and being disposed parallel to the electric component of the electromagnetic field, a like plurality of elements capable of radiating electromagnetic energy uniformly distributed in an array in said remote device, and a like plurality of coaxial conductor transmission lines connecting said probes to corresponding ones of said elements.

9. The combination of a geodesic lens including an arcuate array of uniformly distributed feed elements with apparatus for transferring the electromagnetic field distribution pattern across the aperture of a horn radiator to a selected group of elements in said arcuate array, said apparatus comprising an annular housing having an annular cavity therein, a plurality of probes uniformly distributed in an array about the circumference of said housing and extending into said cavity in a direction normal to the plane of said housing, a horn radiator having a rectangular aperture, means supporting said horn with its aperture closely confronting said array of probes and with its narrow dimension parallel to said probes, said probes being spaced such that a group of several probes are spanned by the width dimension of said aperture, and a like plurality of coaxial transmission lines each connecting one of said probes to a corresponding feed element in said lens whereby the group of probes confronting the aperture of the horn is adapted to transfer the field distribution pattern of the horn to the corresponding group of feed elements of the lens, said horn supporting means including means for rotating said horn in the plane of said housing about the axis thereof thereby to cause the aperture of said horn to successively confront different groups of probes.

10. Apparatus in accordance with claim 9 wherein said coaxial transmission lines are of equal lengths.

11. Apparatus in accordance with claim 9 wherein the spacing of said probes is the same as the spacing of said feed elements.

12. Apparatus in accordance with claim 9 wherein the spacing of said probes differs from the spacing of said feed elements.

13. Apparatus in accordance with claim 9 wherein said cavity is of generally rectangular cross-section and open at the side facing radially inward, the height dimension of said open side being slightly greater than the narrow dimension of said horn whereby said horn does not contact said housing as it rotates, and conductive members secured to the narrow walls of said horn in the region of its aperture and extending circumferentially therefrom, said conductive members and the wall of said cavity opposite said open side defining a wave guide dimensioned beyond cut off at the frequency of operation.

14. Apparatus for transferring the electromagnetic field distribution pattern across the aperture of a horn radiator to a device remote from the horn, comprising, a housing having a cavity of generally rectangular cross-section formed therein, one side of said cavity being open, a plurality of parallel probes extending into said cavity and distributed in an elongated array substantially parallel to the open side of said cavity, means supporting said horn with its aperture in a plane substantially parallel to and closely confronting said array of probes, said probes being parallel to the electric component of the field pattern and spaced such that a plurality of probes are distributed across the width dimension of the aperture, means secured to said horn and coactive with the side of said cavity opposite said open side to confine energy from said horn to the region of said cavity confronting said aperture, said horn supporting means including means for moving the aperture of the horn relative to said array of probes in a plane closely parallel to said array, a like plurality of elements distributed in an array in said remote device, and a like plurality of coaxial conductors connecting said probes to corresponding ones of said elements.

15. The combination of a geodesic lens including an array of feed elements with apparatus for transferring the field distribution pattern across the aperture of a horn radiator to a selected group of feed elements in said array, said apparatus comprising an elongated housing having a cavity of rectangular cross-section therein, one side of said cavity being open, a plurality of probes distributed in an array along the length of said housing and extending into said cavity in a direction normal to the plane of said housing, a horn radiator having a rectangular aperture, means supporting said horn to extend into the open side of said cavity with its aperture closely confronting said array of probes and with its narrow dimension parallel to said probes, said probes being spaced such that a group of several probes are spanned by the width dimension of said aperture, and a like plurality of coaxial transmission lines each connecting one of said probes to a corresponding feed element in said lens whereby the group of probes confronting the aperture of the horn is operative to transfer the field distribution pattern of the horn to the corresponding group of feed elements of the lens.

16. Apparatus in accordance with claim 15 wherein said horn supporting means includes means for moving said horn in the plane of said housing relative to said array of probes thereby to cause the aperture of said horn to successively confront different groups of probes.

References Cited by the Examiner

UNITED STATES PATENTS

| | | | |
|---|---|---|---|
| 2,367,764 | 1/1945 | Ferris | 343—753 X |
| 2,566,703 | 9/1951 | Iams | 343—753 |
| 2,836,822 | 5/1958 | Ehrlich et al. | 343—754 |

FOREIGN PATENTS 860,826    2/1961    Great Britain.

HERMAN KARL SAALBACH, *Primary Examiner.*